(12) United States Patent
Yoon et al.

(10) Patent No.: US 9,318,899 B2
(45) Date of Patent: Apr. 19, 2016

(54) MULTI WIRELESS CHARGING APPARATUS AND METHOD FOR MANUFACTURING THE SAME

(71) Applicant: SAMSUNG ELECTRO-MECHANICS CO., LTD., Suwon (KR)

(72) Inventors: Young Seok Yoon, Suwon (KR); Jung Ho Yoon, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 444 days.

(21) Appl. No.: 13/729,826

(22) Filed: Dec. 28, 2012

(65) Prior Publication Data

US 2013/0169222 A1    Jul. 4, 2013

(30) Foreign Application Priority Data

Dec. 30, 2011    (KR) .......................... 10-2011-0146826

(51) Int. Cl.
| | |
|---|---|
| *H02J 7/00* | (2006.01) |
| *H02J 7/02* | (2006.01) |
| *H02J 5/00* | (2006.01) |
| *H01F 38/14* | (2006.01) |

(52) U.S. Cl.
CPC ................. *H02J 7/00* (2013.01); *H02J 7/0042* (2013.01); *H02J 7/025* (2013.01); *H01F 38/14* (2013.01); *H02J 5/005* (2013.01); *Y10T 156/1002* (2015.01)

(58) Field of Classification Search
CPC ............. H01F 38/14; H02J 5/005; H02J 7/00; H02J 7/0042; H02J 7/025; Y10T 156/1002
See application file for complete search history.

(56) References Cited

U.S. PATENT DOCUMENTS

| | | | | |
|---|---|---|---|---|
| 8,283,812 | B2 * | 10/2012 | Azancot et al. ............... | 307/328 |
| 2009/0096413 | A1 * | 4/2009 | Partovi et al. ................. | 320/108 |
| 2011/0178252 | A1 * | 7/2011 | Sung et al. .................... | 525/482 |

FOREIGN PATENT DOCUMENTS

KR    2010-0094197    8/2010

* cited by examiner

*Primary Examiner* — Nha Nguyen
(74) *Attorney, Agent, or Firm* — NSIP Law

(57) ABSTRACT

Disclosed herein are a multi wireless charging apparatus and a method for manufacturing the same. The multi wireless charging apparatus includes: a control unit wholly controlling a multi wireless charging process; and a plurality of wireless charging units electrically connected with the control and deformed into a roll form by being bonded so as to a plurality of interlayer voids at the time of laminating a plurality of flexible substrates. By this configuration, the multi wireless charging apparatus can be rolled up in a roll form while having a slim thickness and therefore, can be conveniently carried.

17 Claims, 10 Drawing Sheets

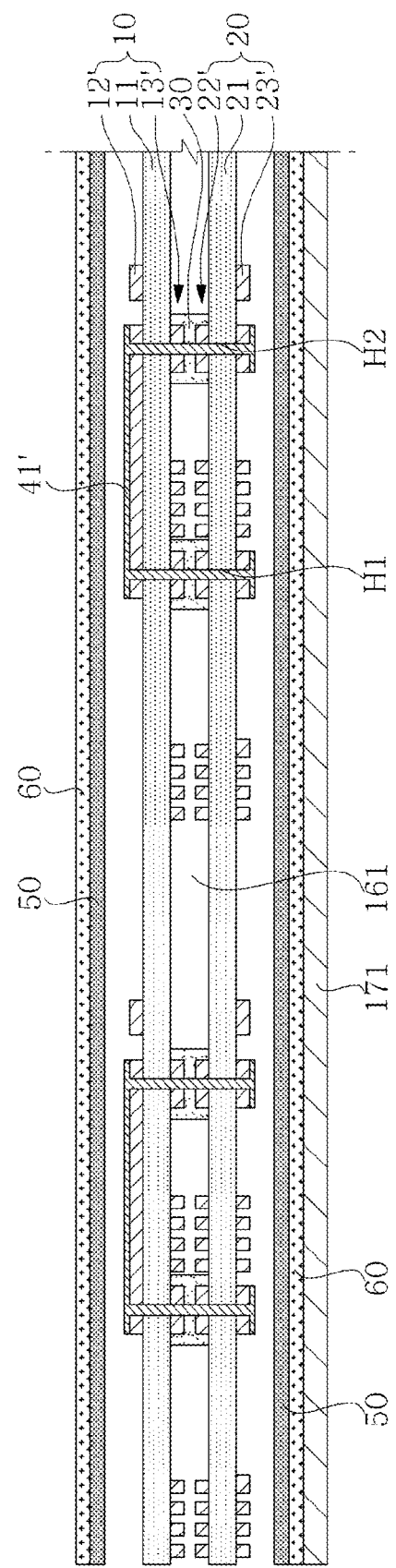

MULTI WIRELESS CHARGING APPARATUS AND METHOD FOR MANUFACTURING THE SAME

CROSS REFERENCE TO RELATED APPLICATION

This application claims the benefit of Korean Patent Application No. 10-2011-0146826, filed on Dec. 30, 2011, entitled "Multi Wireless Charging Apparatus and Manufacturing Method thereof", which is hereby incorporated by reference in its entirety into this application.

BACKGROUND OF THE INVENTION

1. Technical Field

The present invention relates to a multi wireless charging apparatus and a method for manufacturing the same.

2. Description of the Related Art

A wireless charging technology is a technology of transmitting power required to wirelessly charge a battery without using a power supply code or a charging connector. The prior art has been restrictively used for an electric toothbrush, a home cordless phone, an electrically driven tool, and the like.

Recently, with an explosive increase of a smart phone market, a use of a wireless charging technology has accelerated. The smart phone enables a user to freely enjoy abundant contents and multimedia any time, but has a short use time due to a limitation of battery capacity. The environment of the wireless charging technology in a smart phone market has been greatly changed with the appearance of a smart phone corresponding to wireless charging since 2010 and products with a wireless charging module for the purpose of wirelessly charging a mobile phone and a smart phone have been continuously published at home and abroad from 2011.

Since a wireless power consortium (WPC) for expanding a contactless type standard published a first standard specification for devices having an output of 5 W or less in July, 2010, industries have continuously joined the WPC to regularly employ consistent standards in the industry. The wireless charging technology of which the market has been expanded due to an adoption of a smart phone is expected to be used for devices having a large output such as a digital camera, a tablet PC, a monitor, a digital TV, and the like, in the future.

An electromagnetic induction type that is excellent in terms of commercialization and practical use among several technologies capable of implementing wireless charging uses electromagnetic energy coupling generated between coils wound several times, as described in Korean Patent Laid-Open Publication No. 2010-0094197 (laid-open published on Aug. 26, 2010).

This is implemented as products on the basis of a Faraday's law by which electromagnetic field generated by coils in which AC or high frequency current flows generates electromotive force at output terminals of adjacent coils. When a general mobile phone, a smart phone, a digital camera, a tablet PC, a monitor, a notebook, and the like, in which a wireless charging receiving module is mounted is disposed on a charging surface of a wireless charger in which a wireless charging transmitting module is mounted, an analog circuit and a power circuit performing a charging function, a control circuit, a rectifying circuit, a charging circuit, and the like, are operated to charge a battery mounted in a device.

However, the wireless charging apparatus has a large volume and therefore, cannot be easily stored and carried, such that it is difficult to wirelessly charge a plurality of devices simultaneously.

SUMMARY OF THE INVENTION

The present invention has been made in an effort to provide a multi wireless charging apparatus having a slim thickness so as to be rolled up in a roll form.

Further, the present invention has been made in an effort to provide a method for manufacturing a multi wireless charging apparatus.

According to a preferred embodiment of the present invention, there is provided a multi wireless charging apparatus including: a control unit wholly controlling a multi wireless charging process; and a plurality of wireless charging units electrically connected with the control and deformed into a roll form by being bonded to be provided with a plurality of interlayer voids at the time of laminating a plurality of flexible substrates.

Each of the wireless charging units may be further provided with shielding layers made of a flexible conductive material and formed on lower surfaces of the plurality of flexible substrates so as to shield electromagnetic field.

The flexible conductive material may be any one of a conductive paste, conductive coating, and a conductive sheet.

Each of the wireless charging units may include a plurality of double-sided flexible copper clad laminates (FCCL) having circuit layers formed on upper surfaces or lower surfaces thereof; and an adhesive layer in which an adhesive is separately disposed into the corresponding area to be provided with a plurality of interlayer voids by bonding only portions at which layers are electrically connected with each other at the time of laminating the plurality of double-sided FCCLs.

The adhesive may be a flexible adhesive.

The flexible adhesive may be a prepreg in which a semi hardening resin is impregnated in a glass fiber.

Each of the circuit layers may include: coil patterns formed in a continuous closed loop and having first ends disposed inside the closed loop and second ends disposed outside the closed loop; first electrode patterns spaced apart from the first ends and disposed outside the closed loop of the coil patterns; and second electrode patterns correspondingly spaced apart from the first electrode patterns and disposed outside the closed loop of the coil patterns, wherein the second ends are integrally formed with the second electrode patterns.

The adhesive layer may bond the plurality of double-sided FCCLs by disposing the adhesive so as to correspond to a portion at which the first ends, the first electrode patterns, and the second electrode patterns integrally formed with the second ends that are formed on the plurality of double-sided FCCLs, respectively, are disposed, for interlayer connection of the plurality of double-sided FCCLs.

Each of the wireless charging units may further include: a first conductive via hole formed to electrically interlayer-connect the first ends of each layer bonded by the adhesive on the plurality of double-sided FCCLs; a second conductive via hole formed to electrically interlayer-connect the first electrode patterns of each layer bonded by the adhesive on the plurality of double-sided FCCLs; a third conductive via hole formed to electrically interlayer-connect the second electrode patterns integrally formed with the second ends bonded by the adhesive on the plurality of double-sided FCCLs; and a wiring layer formed by crossing the first and second conductive via holes so as to connect between the first and second conductive via holes on an outer layer of the uppermost double-sided FCCL among the plurality of double-sided FCCLs.

Each of the wireless charging units may further include a cover layer covering an upper surface of the uppermost double-sided FCCL or a lower surface of the lowest double-sided FCCL among the plurality of double-sided FCCLs.

The cover layer may be an insulating layer made of a flexible material that is bonded by a flexible adhesive.

According to another preferred embodiment of the present invention, there is provided a method for manufacturing a multi wireless charging apparatus, including: (A) forming a plurality of wireless charging units deformed into a roll form by being bonded to be provided with a plurality of interlayer voids at the time of laminating a plurality of flexible substrates; and (B) forming a control unit electrically connected with the plurality of wireless charging units to wholly control multi charging of the plurality of wireless charging units.

The step (A) may include: (A1) preparing a plurality of double-sided FCCLs having a circuit layer formed on an upper surface or a lower surface thereof; (A2) compressing the plurality of double-sided FCCLs using an adhesive separately disposed into the corresponding area as an intermediate medium to be provided with a plurality of interlayer voids by bonding only portions at which layers are electrically connected with each other at the time of laminating the plurality of double-sided FCCLs; (A3) forming a plurality of conductive via holes for electrically interlayer-connecting portions bonded by the adhesive on the plurality of compressed double-sided FCCLs and forming a wiring layer on an outer layer of the uppermost double-sided FCCL among the plurality of double-sided FCCLs so that some of the conductive via holes are electrically connected with each other; and (A4) forming a cover layer covering outer surfaces of the plurality of double-sided FCCLs.

In the step (A1), each of the circuit layers may be formed by including: (A1-1) forming coil patterns formed in a continuous closed loop and having first ends disposed inside the closed loop and second ends disposed outside the closed loop; (A1-2) forming first electrode patterns spaced apart from the first ends and disposed outside the closed loop of the coil patterns; and (A1-3) forming second electrode patterns correspondingly spaced apart from the first electrode patterns and disposed outside the closed loop of the coil patterns, wherein the second ends are integrally formed with the second electrode patterns.

In the step (A2), the adhesive layer may be formed by including: (A2-1) disposing the adhesive so as to correspond to a portion at which the first ends, the first electrode patterns, and the second electrode patterns integrally formed with the second ends that are formed on the plurality of double-sided FCCLs, respectively, are disposed, for interlayer connection of the plurality of double-sided FCCLs; and (A2-2) compressing and adhering the plurality of double-sided FCCLs and the adhesive.

The step (A3) may include: (A3-1) forming a first conductive via hole for electrically interlayer-connecting the first ends of each layer bonded by the adhesive on the plurality of double-sided FCCLs; (A3-2) forming a second conductive via hole for electrically interlayer-connecting the first electrode patterns of each layer bonded by the adhesive on the plurality of double-sided FCCLs; (A3-3) forming a third conductive via hole for electrically interlayer-connecting the second electrode patterns integrally formed with the second ends bonded by the adhesive on the plurality of double-sided FCCLs; and (A3-4) forming a wiring layer crossing the first and second conductive via holes so as to connect between the first and second conductive via holes on a part of the upper surface of the uppermost double-sided FCCL among the plurality of double-sided FCLLs.

The step (A4) may include: (A4-1) forming a first insulating layer made of a flexible insulating material so as to protect the circuit formed on the upper surface of the uppermost double-sided FCCL among the plurality of double-sided FCCLs and prevent the circuit from being oxidized; (A4-2) forming a second insulating layer made of a flexible insulating material so as to protect the circuit formed on the lower surface of the lowest double-sided FCCL among the plurality of double-sided FCCLs and prevent the circuit from being oxidized; and (A4-3) forming a shielding layer made of a flexible conductive material on an outer surface of the second insulating layer so as to shield electromagnetic field for each area of the wireless charging part.

The flexible conductive material may be any one of a conductive paste, conductive coating, and a conductive sheet.

BRIEF DESCRIPTION OF THE DRAWINGS

The above and other objects, features and advantages of the present invention will be more clearly understood from the following detailed description taken in conjunction with the accompanying drawings, in which:

FIGS. 4A to 4G are diagrams for describing a method for manufacturing a multi wireless charging apparatus according to another preferred embodiment of the present invention.

DESCRIPTION OF THE PREFERRED EMBODIMENTS

Figure 1A:
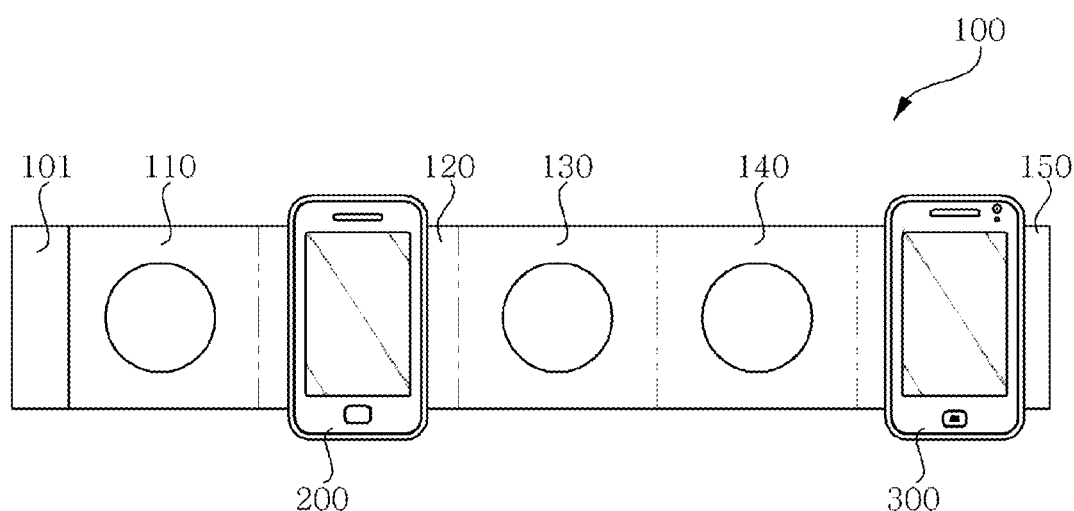
FIGS. 1A and 1B are a top view and a side view of a multi wireless charging apparatus according to a preferred embodiment of the present invention.

The above and other objects, features and advantages of the present invention will be more clearly understood from preferred embodiments and the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted. In the description, the terms "first", "second", and so on are used to distinguish one element from another element, and the elements are not defined by the above terms.

Hereinafter, preferred embodiments of the present invention will be described in detail with reference to the accompanying drawings.

Figure 1B:
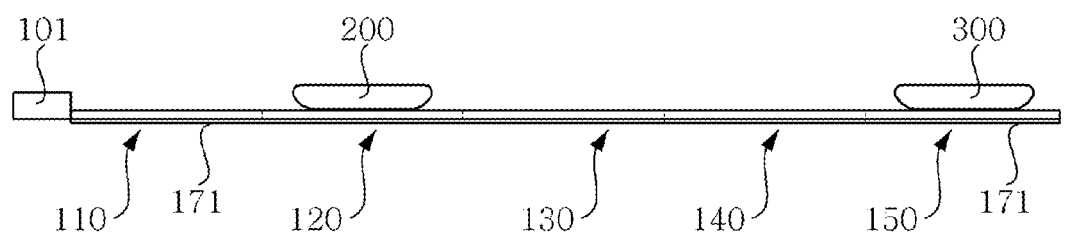
Figure 2:
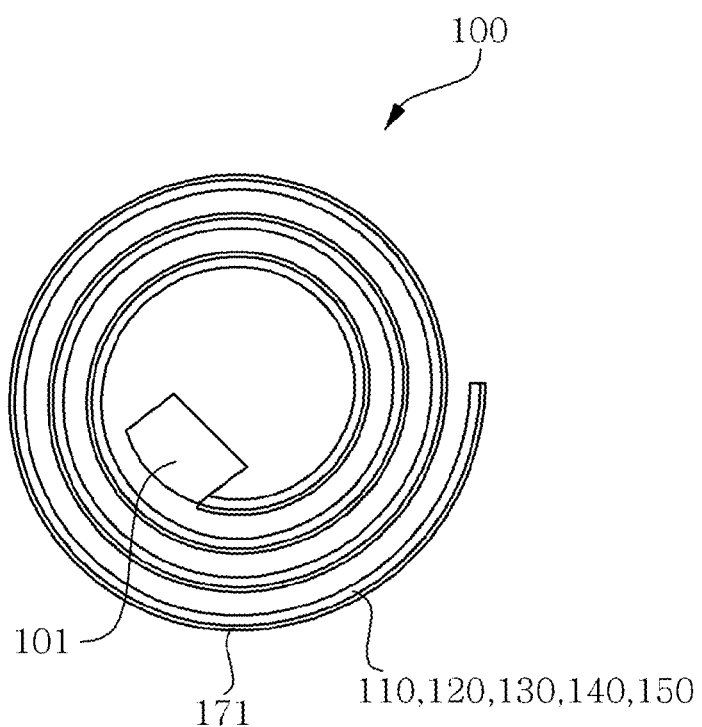
FIG. 2 is a side view illustrating a state in which the multi wireless charging apparatus according to the preferred embodiment of the present invention is rolled up in a roll form.

FIGS. 1A and 1B are a top view and a side view of a multi wireless charging apparatus according to a preferred embodiment of the present invention and FIG. 2 is a side view illustrating a state in which the multi wireless charging apparatus according to the preferred embodiment of the present invention is rolled up in a roll form.

For example, as illustrated in FIGS. 1A and 1B, a multi wireless charging apparatus 100 according to a preferred embodiment of the present invention includes, for example, a control unit 101 that wholly controls a multi wireless charging process, a plurality of wireless charging units 110 to 150 that are electrically connected with the control unit 101 and are bonded to include a plurality of interlayer voids at the time of laminating a plurality of flexible substrates to be deformed into a roll form, for example, a first wireless charging unit 110 electrically connected with the control unit 101, a second wireless charging unit 120 electrically connected with the control unit 101 and extendedly connected with the first wireless charging unit 110 at a predetermined distance, a third wireless charging unit 130 that is electrically connected with the control unit 101 and extendedly connected with the second wireless charging unit 120 at a predetermined distance, a fourth wireless charging unit 140 that is electrically connected with the control unit 101 and extendedly connected with the third wireless charging unit 130 at a predetermined distance, and a fifth wireless charging unit 150 that is electrically connected with the control unit 101 and extendedly connected with the fourth wireless charging unit 140 at a predetermined distance.

In addition, the multi wireless charging apparatus 100 according to the preferred embodiment of the present invention may be configured to further include a plurality of wireless charging units that are extendedly connected with the fifth wireless charging unit 150 at a predetermined distance.

The multi wireless charging apparatus 100 includes shielding layers 171 disposed on lower surfaces of each of the first wireless charging unit 110 to the fifth wireless charging unit 150 to shield electromagnetic field and wireless charging receivers 200 and 300 such as a smart phone, a mobile communication terminal, and the like, to be wirelessly charged are disposed on upper surfaces of each of the first wireless charging unit 110 to the fifth wireless charging unit 150.

Figure 3A:
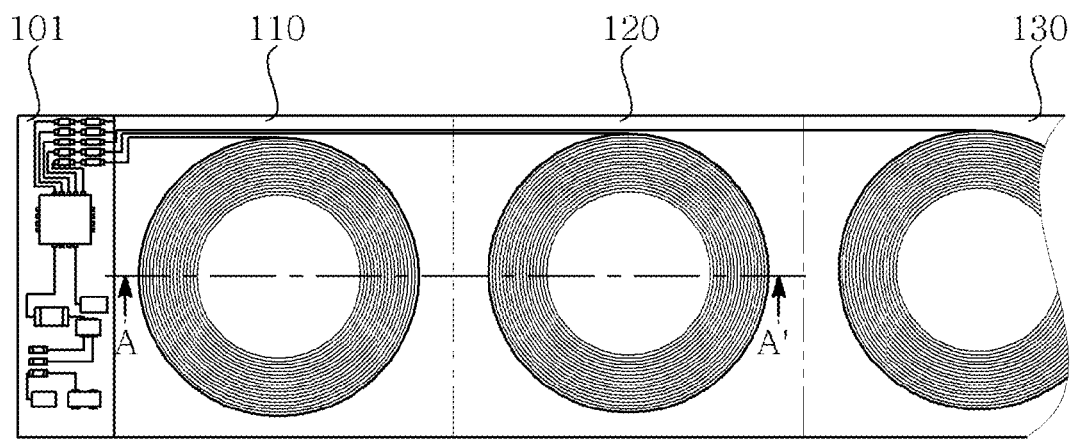
FIG. 3A is a top perspective view of the multi wireless charging apparatus according to the embodiment of the present invention and FIG. 3B is a cross-sectional view illustrating a cross section taken along the line A-A' of FIG. 3A.

Hereinafter, an internal structure of the multi wireless charging apparatus 100 according to the preferred embodiment of the present invention will be described with reference to FIGS. 3A to 3B. FIG. 3A is a top perspective view of the multi wireless charging apparatus according to the embodiment of the present invention and FIG. 3B is a cross-sectional view illustrating a cross section taken along the line A-A' of FIG. 3A.

In the internal structure of the multi wireless charging apparatus 100 according to the preferred embodiment of the present invention, as illustrated in FIG. 3A, the control unit 101 include a plurality of circuits and elements and each of the first wireless charging unit 110 to the fifth wireless charging unit 150 includes coil patterns that are connected with each driver 103 (see FIG. 5) mounted in the control unit 101 and extendedly provided.

Figure 3B:
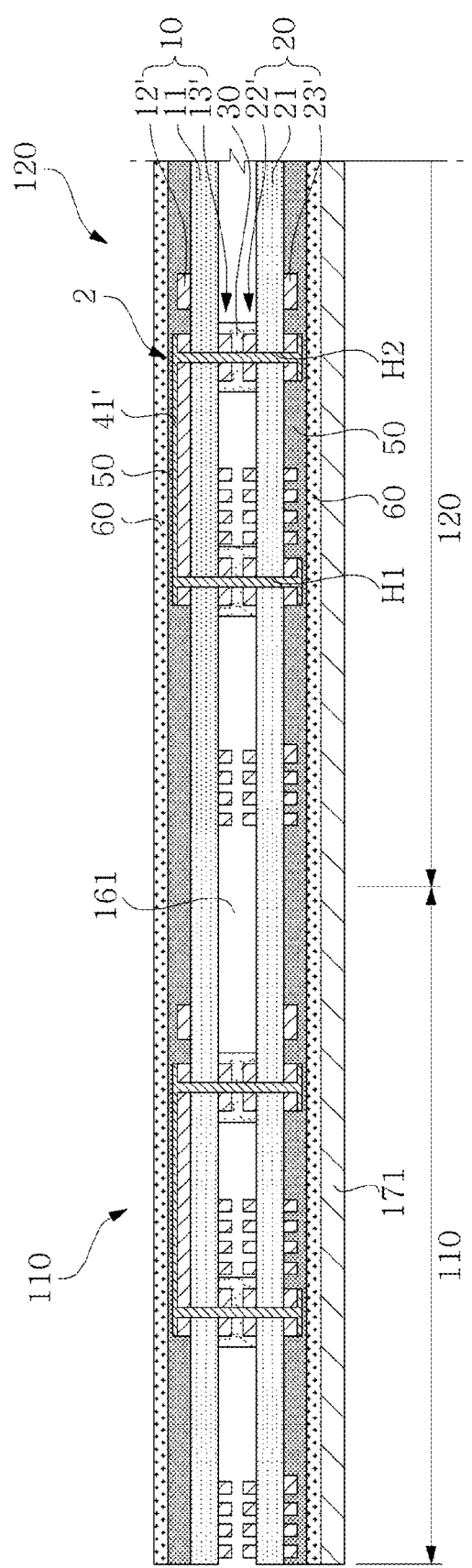

In addition, as illustrated in FIG. 3B taken along the line A-A' of FIG. 3A, the internal structures of each of the first wireless charging unit 110 to the fifth wireless charging unit 150 of the multi wireless charging apparatus 100 are the same and include each interlayer void 161.

In detail, each of the first wireless charging unit 110 to the fifth wireless charging unit 150 includes a plurality of double-sided flexible copper clad laminates (FCCLs) 10 and 12 including circuit layers 12', 22', 13' and 23' on upper surfaces 12 and 22 or lower surfaces 13 and 23 and includes an adhesive layer 30 in which an adhesive is separately disposed into the corresponding area to be provided with a plurality of interlayer voids 161 by bonding only portions at which layers are electrically connected with each other at the time of laminating the plurality of double-sided FCCLs.

Each circuit layer 12', 22', 13' and 23' have coil patterns 13-1, 22-1, and 23-1 formed of a plurality of continuous closed loops that are formed on lower surfaces 13 and 23 or upper surfaces 12 and 22 of the double-sided FCCLs 10 and 20. In this case, first ends 13-2, 22-2, and 23-2 of the coil patterns 13-1, 22-1, and 23-1 are disposed inside the closed loop and second ends (not illustrated) of the coil patterns 13-1, 22-1, and 23-1 is disposed outside the closed loop.

Further, first electrode patterns 13-3, 22-3, and 23-3 to be electrically connected with the first ends 13-2, 22-2, and 23-2 are disposed outside a closed loop of the coil patterns 13-1, 22-1, and 23-1 so as to be spaced apart from the first ends 13-2, 22-2, and 23-2 and second electrode patterns (not illustrated) to be electrically connected with the second ends (not illustrated) are disposed outside the closed loop of the coil patterns 13-1, 22-1, and 23-1 so as to be correspondingly spaced apart from the first ends 13-2, 22-2, and 23-2. In this case, the second ends (not illustrated) are integrally formed with the second electrode patterns (not illustrated).

As such, the plurality of double-sided FCCLs 10 and 20 on which each circuit layer 12', 22', 13', and 23' are formed are bonded to each other by the adhesive layer 30 for interlayer connection.

The adhesive layer 30 bonds the plurality of double-sided FCCLs 10 and 20 by disposing the adhesive so as to correspond to a portion at which the first ends 13-2, 22-2, and 23-2, the first electrode patterns 13-3, 22-3, and 23-3, and the second electrode patterns (not illustrated) integrally formed with the second ends are disposed.

Here, as the adhesive, a flexible adhesive may be used. An example of the flexible adhesive may include a prepreg in which a semi hardening resin is impregnated in a glass fiber.

Next, each wireless charging unit 110 to 150 includes a first conductive via hole H1 formed by a drilling method, and the like, so as to electrically interlayer-connect the first ends 13-2, 22-2, and 23-2 of each layer bonded by the adhesive layer 30 on the plurality of double-sided FCCLs 10 and 20, a second conductive via hole H2 formed so as to electrically interlayer-connect the first electrode patterns 13-3, 22-3, and 23-3 of each layer bonded by the adhesive layer 30 on the plurality of double-sided FCCLs 10 and 20, and a third conductive via hole (not illustrated) formed so as to electrically interlayer-connect the second electrode patterns (not illustrated) integrally formed with the second ends bonded by the adhesive layer 30 on the plurality of double-sided FCCLs 10 and 20.

In addition, an outer layer of the uppermost double-sided FCCL 10 of the plurality of double-sided FCCLs 10 and 20 is provided with a wiring layer 41' formed by crossing the first and second conductive via holes H1 and H2 so as to connect between the first and second conductive via holes H1 and H2.

In addition, each wireless charging unit 110 to 150 may further include a cover layer 60 formed so as to cover an upper surface of the uppermost double-sided FCCL 10 or a lower surface of a lowest double-sided FCCL 20 of the plurality of double-sided FCCLs 10 and 20, thereby protecting the wiring layer 41' and the circuit layers 12', 22', 13', and 23'. In this case, the cover layer 60 is formed of an insulating layer that is made of a flexible material and is bonded by a flexible adhesive 50.

Further, each wireless charging unit 110 to 150 may further include a shielding layer 171 made of a flexible conductive material that is formed on the lower surface of the lowest double-sided FCCL 20 of the plurality of double-sided FCCLs 10 and 20, thereby shielding an electromagnetic field. In this case, an example of the flexible conductive material may include any one of a conductive paste, conductive coating, and a conductive sheet.

The plurality of wireless charging units 110 to 150 according to the embodiment of the present invention configured as described above can be implemented in a folding or roll form as in FIG. 2 by bonding only a minimum area of the flexible substrates using the adhesive layer 30 to be provided with the plurality of interlayer voids at the time of laminating the plurality of flexible substrates.

In addition, the shielding between respective wireless charging units 110 to 150 is made by the shielding layer 171, such that the reliability of wireless charging of the wireless charging unit 110 to 150 can be improved.

Here, the multi wireless charging apparatus 100 according to the preferred embodiment of the present invention uses the two double-sided FCCLs 10 and 20, but the preferred embodiment of the present invention is not limited thereto. Therefore, the multi wireless charging apparatus 100 may be formed so that the plurality of circuit layers are laminated using the plurality of double-sided FCCLs.

Hereinafter, a method for manufacturing a multi wireless charging apparatus according to another preferred embodiment of the present invention will be described with reference to FIGS. 4A to 4G. FIGS. 4A to 4G are cross-sectional views sequentially describing the process of a method for manufacturing a wireless charging apparatus according to another preferred embodiment of the present invention and are diagrams illustrated based on the line A-A' of FIG. 3.

Figure 4A:
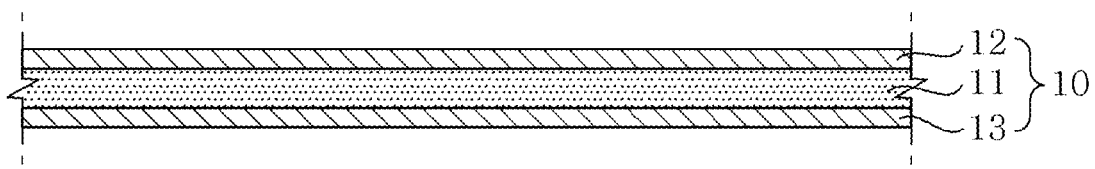

The method for manufacturing a multi wireless charging apparatus 100 according to another preferred embodiment of the present invention includes the double-sided FCCL 10 and 20 formed by laminating first copper foils 12 and 22 on upper surfaces of first insulating layers 11 and 21 made of thermoplastic materials such as polyimide, and the like, and laminating second copper foils 13 and 23 on lower surfaces of the first insulating layers 11 and 21, as illustrated in FIG. 4A.

Figure 4B:
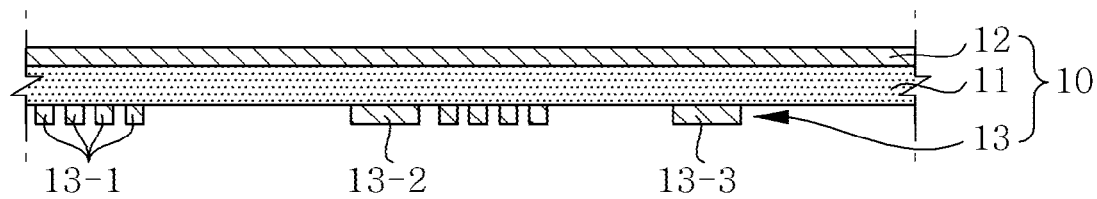

After the double-sided FCCLs 10 and 20 are prepared, as illustrated in FIG. 4B, the predetermined circuit layers 12', 22', 13', and 23' are formed on any one surface or both surfaces of the first copper foils 12 and 22 and the second copper foils 13 and 23 of each of the double-sided FCCLs 10 and 20 for each area of each of first wireless charging unit 110 to the fifth wireless charging unit 150.

For example, the second copper foil 13 of the first double-sided FCCL 10 is provided with the first circuit layer 13' including the coil pattern 13-1, the first end 13-2 of the coil pattern 13-1, and the first electrode pattern 13-3 that are formed in a plurality of continuous closed loops.

Similarly, the first copper foil 22 of the second double-sided FCCL 20 is provided with the second circuit layer 22' corresponding to the first circuit layer 13' and including the coil pattern 22-1, the first end 22-2 of the coil pattern 22-1, and the first electrode pattern 22-3 that are formed in a plurality of continuous closed loops.

Here, the first and second circuit layers 13' and 22' are each provided with the second electrode patterns (not illustrated) of each layer that are integrally formed with the second ends (not illustrated) of the coil patterns 13-1 and 22-1 of each layer.

In this case, the first ends 13-2 and 22-2 are disposed inside the closed loop and the second ends (not illustrated) are disposed outside the closed loop.

Figure 4C:
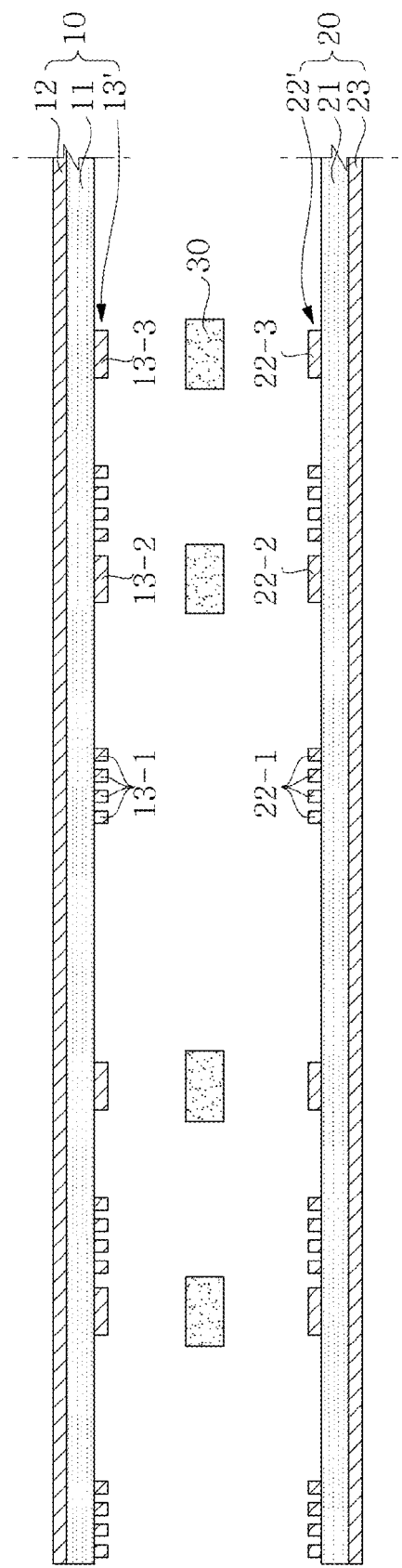

Next, as illustrated in FIG. 4C, in the first double-sided FCCL 10 and the second double-sided FCCL 20, the first circuit layer 13' corresponds to the second circuit layer 22' and the adhesive layers 30 are each disposed between the first double-sided FCCL 10 and the second double-sided FCCL 20 for each area of the first wireless charging unit 110 to the fifth wireless charging unit 150.

In this case, the adhesive layers 30 are disposed only at the portions at which layers are electrically connected with each other, that is, the portions at which the first ends 13-2, 22-2, and 23-2, the first electrode patterns 13-3, 22-3, and 23-3, and the second electrode patterns (not illustrate) integrally formed with the second ends are formed.

Figure 4D:
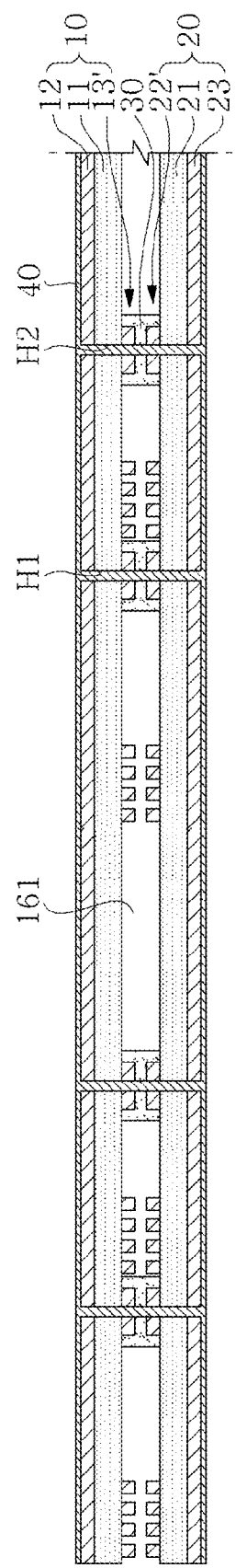

The first double-sided FCCL 10 and the second double-sided FCCL 20 are thermally compressed by the adhesive layer 30 disposed as above and thus, are formed to have a laminated structure as illustrated in FIG. 4D.

Using the plurality of double-sided FCCLs of which any one surface or both surfaces are provided with the circuit layers by the foregoing method, it is possible to easily form the coil patterns formed in a plurality of closed loops. In addition, the overall thickness of the multi wireless charging apparatus can be slimmed by including the adhesive layer 30 only in some areas by the thermo compression process and the plurality of interlayer voids 161 may be provided between the plurality of double-sided FCCLs 10 and 20.

Next, for the laminated double-sided FCCLs 10 and 20, the first conductive via holes H1 for electrical interlayer connection of the first ends 13-2 and 22-2 formed on the circuit layers 13' and 22' and the second conductive via hole H2 for interlayer connection of the first electrode patterns 13-3 and 22-3 are provided.

Here, the first and second conductive via holes H1 and H2, which are a plated through hole (PTH), are formed by a mechanical drilling process such as computerized numerical control (CNC) drilling, and the like.

Although not illustrated, a third metal via hole (not illustrated) for electrical interlayer connection of the second electrode patterns (not illustrated) integrally formed with the second ends of each layer may be formed by a similar method.

When the first and second conductive via holes H1 and H2 formed by the drilling process are plated with conductive metals, as illustrated in FIG. 4D, the inside of the first and second conductive via holes H1 and H2 are filed with conductive metals and a plating layer 40 covering the outer surfaces of the double-sided FCCLs 10 and 20 is formed.

Figure 4E:
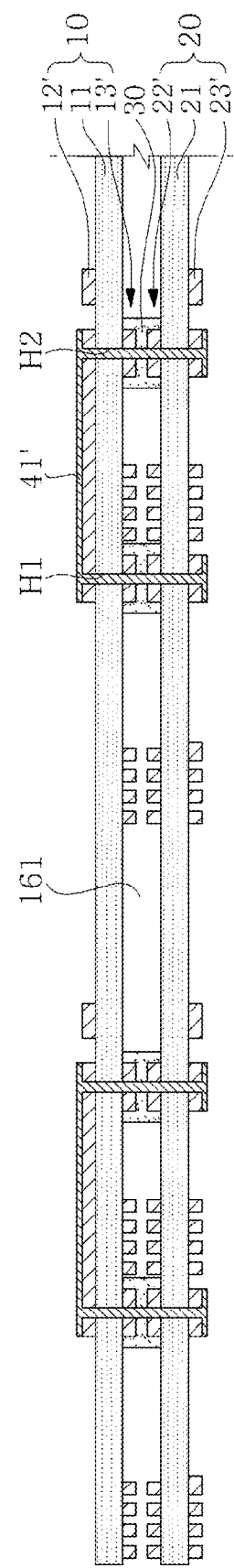

Next, the wiring pattern 41' crossing from the first conductive via hole H1 to the second conductive via hole H2 is formed by etching the upper portion of the plating layer 40 and the external copper foil 12 so as to electrically connect the first ends 13-2 with the first electrode patterns 13-3 and 22-3, as illustrated in FIG. 4E.

Next, in order to protect the exposed circuit including the wiring pattern 41' and prevent the exposed circuit from being oxidized, the exposed surface of the upper insulating layer 11 and the exposed surface of the lower insulating layer 21 including the wiring pattern 41' are subjected to a coverlay process forming the cover layer 60 using the flexible adhesive 50.

That is, the first insulating layer is made of a flexible insulating material for protecting the circuit layer formed on the upper surface of the uppermost double-sided FCCL 10 of the plurality of double-sided FCCLs 10 and 20 and preventing the circuit layer from being oxidized and a second insulating layer is made of a flexible insulating material for protecting the circuit layer formed on the lower surface of the lowest double-sided FCCL 20 of the plurality of double-sided FCCLs 10 and 20 and preventing the circuit layer from being oxidized. In this case, an example of the flexible conductive material may include any one of a conductive paste, conductive coating, and a conductive sheet.

The coverlay process, which is a process for protecting and insulating the uppermost and lowest exposed surfaces of the etched double-sided FCCL, can be applied to a fine circuit by making heat-resistant adhesion, electric insulation, flame resistance, elasticity, and flow of an adhesive uniform.

In the foregoing coverlay process, a compressing process may be performed in the state in which the shielding layer is formed on the upper surface of the insulating layer 60 or a process of forming the shielding layer 171 may be separately performed.

Figure 4G:
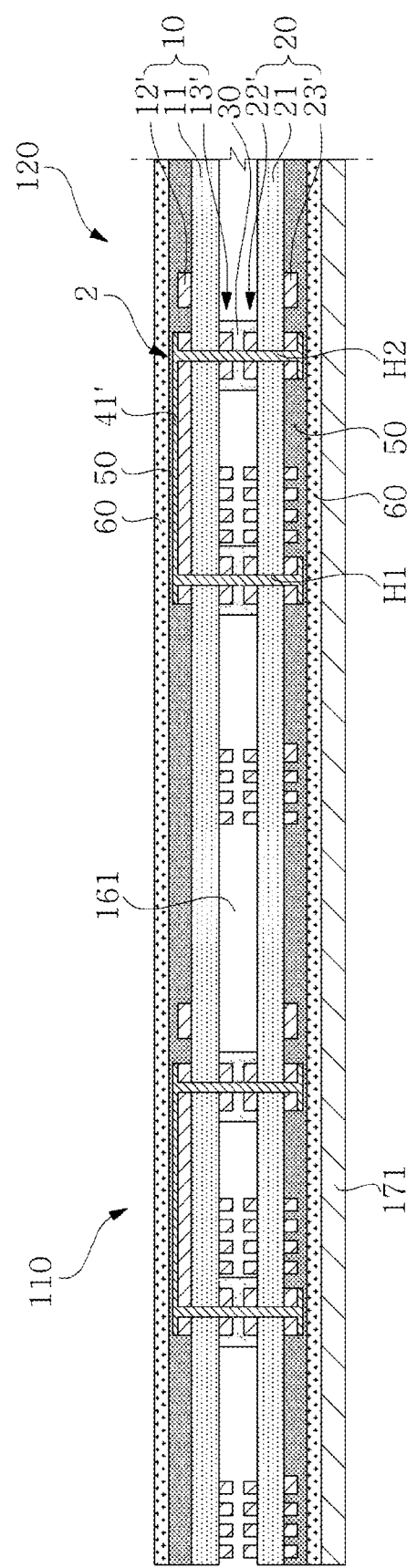

Therefore, as illustrated in FIG. 4G, the shielding layer 171 is formed on the lower surface of the insulating layer 60 for each area of the first wireless charging unit 110 to the fifth wireless charging unit 150.

The shielding layer 171 may be made of conductive materials such as conductive paste, ferrite, and the like.

Next, for the control units 101 connected with each wireless charging unit 110 to 150, elements (not illustrated) configuring the control unit 101 are mounted in the area of the control unit 101.

The method for manufacturing a multi wireless charging apparatus according to another preferred embodiment of the present invention as described above easily forms the structure in which the coil patterns are laminated using the double-sided FCCLs 10 and 20, the overall thickness of the multi wireless charging apparatus 100 is slimmed, and can implement the plurality of wireless charging units 110 to 150 in the folding or roll form by including the interlayer voids 161.

Figure 5:
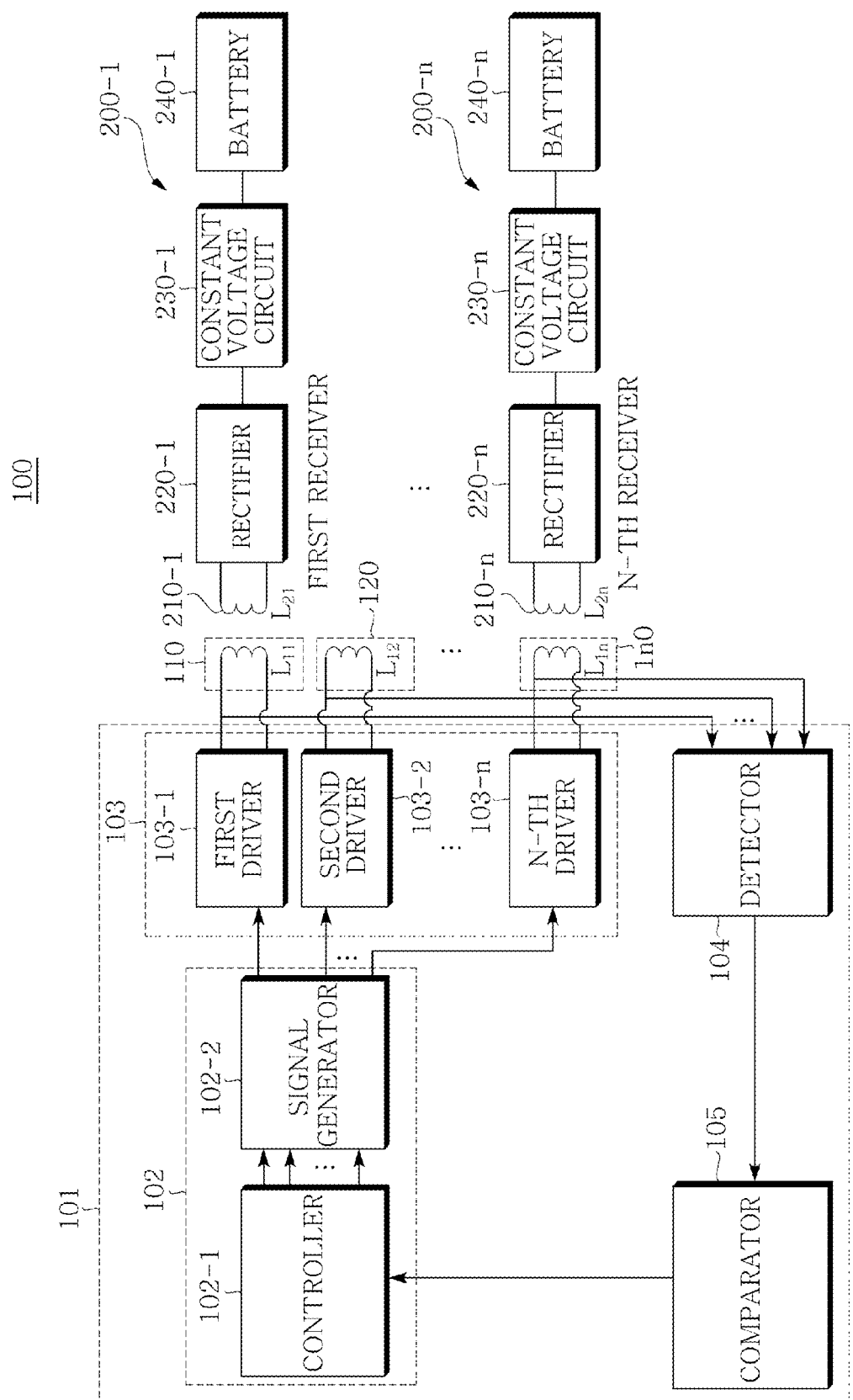
FIG. 5 is a block diagram for describing a function of a multi wireless charging apparatus according to the preferred embodiment of the present invention.

Hereinafter, a function of the multi wireless charging apparatus according to the preferred embodiment of the present invention that is manufactured as described above will be described with reference to FIG. 5. FIG. 5 is a block diagram for describing a function of a multi wireless charging apparatus according to the preferred embodiment of the present invention.

The multi wireless charging apparatus 100 according to the preferred embodiment of the present invention may include a plurality of wireless charging units 110, 120, . . . 1n0 including the first wireless charging unit 110 to the fifth wireless charging units 150 illustrated in FIG. 1 and the control unit 101 controlling the wireless power transmission of the plurality of wireless charging units 110, 120, . . . , 1n0.

In particular, the control unit 101 is configured to include a main controller 102, a plurality of drivers 103 each driving the plurality of wireless charging units 110, 120, . . . , 1n0 according to the control signal from the main controller 102, a detector 104 detecting information on whether wireless charging receivers 200-1, . . . , 200-n are located corresponding to the wireless charging units 110, 120, . . . , 1n0, and a comparator 105 comparing current and voltage detected by the detector 104 to determine whether the detected current and voltage is larger than a set value.

In the multi wireless charging apparatus 100, the comparator 105 determines that the receivers 200-1, . . . , 200-n are present when the current and voltage detected by the detector 104 are larger than the set value and can simultaneously charge wirelessly the plurality of wireless charging receivers 200-1, . . . , 200-n that are located corresponding to the wireless charging units 110, 120, . . . , 1n0, respectively.

Further, when the multi wireless charging apparatus 100 performs the wireless charging in the overlapping state illustrated in FIG. 3A or 3B, the multi wireless charging apparatus 100 may perform the wireless power transmission without the mutual interference due to the shielding layer 171 formed on the lower surfaces of the wireless charging units 110, 120, . . . , 1n0.

Therefore, the multi wireless charging apparatus according to the preferred embodiment of the present invention can simultaneously charge wirelessly the plurality of wireless charging receivers and perform the wireless power transmission without the mutual interference due to the shielding by the shielding layer.

Further, the multi wireless charging apparatus according to the preferred embodiment of the present invention can be overlappingly integrated in various forms due to the folding part the while having a slim thickness and therefore, can be conveniently carried.

The multi wireless charging apparatus according to the preferred embodiments of the present invention can wirelessly charge the plurality of wireless charging receivers simultaneously and form the shielding by the shielding layer to perform the wireless power transmission without mutual interference.

In addition, the multi wireless charging apparatus according to the preferred embodiments of the present invention can be rolled up in a roll form while having a slim thickness and therefore, can be conveniently carried.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A multi wireless charging apparatus, comprising:
a controller wholly controlling a multi wireless charging process; and
a plurality of wireless charging units electrically connected with the control and deformed into a roll form by having layers bonded together at which the layers are electrically connected with each other so as to be provided with a plurality of interlayer voids at the time of laminating a plurality of flexible substrates, each of the wireless charging units comprising
a plurality of double-sided flexible copper clad laminates (FCCLs) having circuit layers formed on upper surfaces or lower surfaces thereof,
an adhesive layer in which an adhesive is separately disposed into a corresponding area to be provided with the plurality of interlayer voids by bonding only portions at which layers are electrically connected with each other at the time of laminating the plurality of double-sided FCCLs, and
a plurality of conductive via holes formed so as to electrically interlayer-connect the portions bonded by the adhesive on the plurality of double-sided FCCLs.

2. The multi wireless charging apparatus as set forth in claim 1, wherein each of the wireless charging units is further provided with shielding layers made of a flexible conductive material and formed on lower surfaces of the plurality of flexible substrates so as to shield electromagnetic field.

3. The multi wireless charging apparatus as set forth in claim 2, wherein the flexible conductive material is any one of a conductive paste, conductive coating, and a conductive sheet.

4. The multi wireless charging apparatus as set forth in claim 1, wherein the adhesive is a flexible adhesive.

5. The multi wireless charging apparatus as set forth in claim 4, wherein the flexible adhesive is a prepreg in which a semi hardening resin is impregnated in the flexible adhesive.

6. The multi wireless charging apparatus as set forth in claim 1, wherein each of the circuit layers includes:
coil patterns formed in a continuous closed loop and having first ends disposed inside the closed loop and second ends disposed outside the closed loop;
first electrode patterns spaced apart from the first ends and disposed outside the closed loop of the coil patterns; and second electrode patterns correspondingly spaced apart from the first electrode patterns and disposed outside the closed loop of the coil patterns, and wherein the second ends are integrally formed with the second electrode patterns.

7. The multi wireless charging apparatus as set forth in claim 6, wherein the adhesive layer bonds the plurality of double-sided FCCLs by disposing the adhesive so as to correspond to a portion at which the first ends, the first electrode patterns, and the second electrode patterns integrally formed with the second ends that are formed on the plurality of double-sided FCCLs, respectively, are disposed, for interlayer connection of the plurality of double-sided FCCLs.

8. The multi wireless charging apparatus as set forth in claim 7, wherein each of the wireless charging units further includes:
 a first conductive via hole formed to electrically interlayer-connect the first ends of each layer bonded by the adhesive on the plurality of double-sided FCCLs;
 a second conductive via hole formed to electrically interlayer-connect the first electrode patterns of each layer bonded by the adhesive on the plurality of double-sided FCCLs;
 a third conductive via hole formed to electrically interlayer-connect the second electrode patterns integrally formed with the second ends bonded by the adhesive on the plurality of double-sided FCCLs; and
 a wiring layer formed by crossing the first and second conductive via holes so as to connect between the first and second conductive via holes on an outer layer of the uppermost double-sided FCCL among the plurality of double-sided FCCLs.

9. The multi wireless charging apparatus as set forth in claim 8, wherein each of the wireless charging units further includes a cover layer covering an upper surface of the uppermost double-sided FCCL or a lower surface of the lowest double-sided FCCL among the plurality of double-sided FCCLs.

10. The multi wireless charging apparatus as set forth in claim 9, wherein the cover layer is an insulating layer made of a flexible material that is bonded by a flexible adhesive.

11. A method for manufacturing a multi wireless charging apparatus, comprising:
 forming a plurality of wireless charging units deformed into a roll form by having layers bonded together at which the layers are electrically connected with each other so as to be provided with a plurality of interlayer voids at the time of laminating a plurality of flexible substrates; and
 forming a controller electrically connected with the plurality of wireless charging units to wholly control multi charging of the plurality of wireless charging units, wherein the forming of the plurality of wireless charging units comprises
  preparing a plurality of double-sided FCCLs having a circuit layer formed on an upper surface or a lower surface thereof,
  compressing the plurality of double-sided FCCLs using an adhesive separately disposed into a corresponding area as an intermediate medium to be provided with the plurality of interlayer voids by bonding only portions at which layer are electrically connected with each other at the time of laminating the plurality of double sided FCCLs,
  forming a plurality of conductive via holes for electrically interlayer-connecting portions bonded by the adhesive on the plurality of compressed double-sided FCCLs and forming a wiring layer on an outer layer of an uppermost double-sided FCCL among the plurality of double-sided FCCLs so that some of the conductive via holes are electrically connected with each other, and
  forming a cover layer covering outer surfaces of the plurality of the double-sided FCCLs.

12. The method as set forth in claim 11, wherein in the preparing the plurality of double-sided FCCLs, each of the circuit layers is formed by:
 forming coil patterns formed in a continuous closed loop and having first ends disposed inside the closed loop and second ends disposed outside the closed loop;
 forming first electrode patterns spaced apart from the first ends and disposed outside the closed loop of the coil patterns; and
 forming second electrode patterns correspondingly spaced apart from the first electrode patterns and disposed outside the closed loop of the coil patterns, and
 wherein the second ends are integrally formed with the second electrode patterns.

13. The method as set forth in claim 12, wherein in the compressing the plurality of double-sided FCCLs, the adhesive layer is formed by:
 disposing the adhesive so as to correspond to a portion at which the first ends, the first electrode patterns, and the second electrode patterns integrally formed with the second ends that are formed on the plurality of double-sided FCCLs, respectively, are disposed, for interlayer connection of the plurality of double-sided FCCLs; and
 compressing and adhering the plurality of double-sided FCCLs and the adhesive.

14. The method as set forth in claim 13, wherein the forming the plurality of conductive via holes includes:
 forming a first conductive via hole for electrically interlayer-connecting the first ends of each layer bonded by the adhesive on the plurality of double-sided FCCLs;
 forming a second conductive via hole for electrically interlayer-connecting the first electrode patterns of each layer bonded by the adhesive on the plurality of double-sided FCCLs;
 forming a third conductive via hole for electrically interlayer-connecting the second electrode patterns integrally formed with the second ends bonded by the adhesive on the plurality of double-sided FCCLs; and
 forming a wiring layer crossing the first and second conductive via holes so as to connect between the first and second conductive via holes on a part of the upper surface of the uppermost double-sided FCCL among the plurality of double-sided FCCLs.

15. The method as set forth in claim 14, wherein the forming the cover layer includes:
 forming a first insulating layer made of a flexible insulating material so as to protect the circuit formed on the upper surface of the uppermost double-sided FCCL among the plurality of double-sided FCCLs and prevent the circuit from being oxidized;
 forming a second insulating layer made of a flexible insulating material so as to protect the circuit formed on the lower surface of the lowest double-sided FCCL among the plurality of double-sided FCCLs and prevent the circuit from being oxidized; and
 forming a shielding layer made of a flexible conductive material on an outer surface of the second insulating layer so as to shield electromagnetic field for each area of the wireless charging part.

16. The method as set forth in claim 15, wherein the flexible conductive material is any one of a conductive paste, conductive coating, and a conductive sheet.

17. A multi wireless charging apparatus, comprising:
a controller wholly controlling a multi wireless charging process; and
a plurality of wireless charging units electrically connected with the control and deformed into a roll form by being bonded to be provided with a plurality of interlayer voids at the time of laminating a plurality of flexible substrates, each of the wireless charging units including
a plurality of double-sided flexible copper clad laminates (FCCL) having circuit layers formed on upper surfaces or lower surfaces thereof,
an adhesive layer in which an adhesive is separately disposed into the corresponding area to be provided with a plurality of interlayer voids by bonding only portions at which layers are electrically connected with each other at the time of laminating the plurality of double-sided FCCLs, each of the circuit layers including
coil patterns formed in a continuous closed loop and having first ends disposed inside the closed loop and second ends disposed outside the closed loop,
first electrode patterns spaced apart from the first ends and disposed outside the closed loop of the coil patterns, and
second electrode patterns correspondingly spaced apart from the first electrode patterns and disposed outside the closed loop of the coil patterns, and wherein the second ends are integrally formed with the second electrode patterns,
wherein the adhesive layer bonds the plurality of double-sided FCCLs by disposing the adhesive so as to correspond to a portion at which the first ends, the first electrode patterns, and the second electrode patterns integrally formed with the second ends that are formed on the plurality of double-sided FCCLs, respectively, are disposed, for interlayer connection of the plurality of double-sided FCCLs, and
each of the wireless charging units further including
a first conductive via hole formed to electrically interlayer-connect the first ends of each layer bonded by the adhesive on the plurality of double-sided FCCLs,
a second conductive via hole formed to electrically interlayer-connect the first electrode patterns of each layer bonded by the adhesive on the plurality of double-sided FCCLs,
a third conductive via hole formed to electrically interlayer-connect the second electrode patterns integrally formed with the second ends bonded by the adhesive on the plurality of double-sided FCCLs, and
a wiring layer formed by crossing the first and second conductive via holes so as to connect between the first and second conductive via holes on an outer layer of the uppermost double-sided FCCL among the plurality of double-sided FCCLs.

* * * * *